United States Patent
Kim et al.

(10) Patent No.: US 12,180,559 B2
(45) Date of Patent: Dec. 31, 2024

(54) BAKE-HARDENED HOT-DIP GALVANIZED STEEL SHEET WITH EXCELLENT POWDERING RESISTANCE, AND MANUFACTURING METHOD THEREFOR

(71) Applicant: POSCO CO., LTD, Pohang-si (KR)

(72) Inventors: Sang-Hyun Kim, Gwangyang-si (KR); Seong-Ho Han, Gwangyang-si (KR); Chung-Won Kim, Gwangyang-si (KR); Yu-Mi Ha, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/035,925

(22) PCT Filed: Nov. 3, 2021

(86) PCT No.: PCT/KR2021/015783
§ 371 (c)(1),
(2) Date: May 8, 2023

(87) PCT Pub. No.: WO2022/103058
PCT Pub. Date: May 19, 2022

(65) Prior Publication Data
US 2024/0011116 A1    Jan. 11, 2024

(30) Foreign Application Priority Data
Nov. 12, 2020 (KR) .................. 10-2020-0150900

(51) Int. Cl.
*B32B 15/01*    (2006.01)
*C21D 1/18*    (2006.01)
(Continued)

(52) U.S. Cl.
CPC ............... *C21D 9/46* (2013.01); *C21D 1/18* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS

| | | | |
|---|---|---|---|
| 5,356,494 A | 10/1994 | Okada et al. | |
| 9,090,960 B2 * | 7/2015 | Maruyama | ............. C22C 38/02 |

(Continued)

FOREIGN PATENT DOCUMENTS

| | | |
|---|---|---|
| JP | H04325656 A | 11/1992 |
| JP | H10195540 | 7/1998 |

(Continued)

OTHER PUBLICATIONS

International Search Report—PCT/KR2021/015783 dated Jan. 20, 2022.

(Continued)

*Primary Examiner* — Daniel J. Schleis
(74) *Attorney, Agent, or Firm* — CANTOR COLBURN LLP

(57) ABSTRACT

Provided are a bake-hardened hot-dip galvanized steel sheet with excellent powdering resistance, and a manufacturing method therefor. The bake-hardened hot-dip galvanized steel sheet comprises, by wt %, 0.0001-0.005% of carbon (C), 0.1-1.2% of manganese (Mn), 0.02% or less of silicon (Si) (excluding 0%), 0.01-0.04% of phosphorus (P), 0.01% or less of sulfur (S) (excluding 0%), 0.01% or less of nitrogen (N) (excluding 0%), 0.01-0.06% of aluminum (sol.Al), 0.003-0.015% of niobium (Nb), 0.0005-0.0035% of boron (B), 0.01-0.1% of chromium (Cr), 0.005-0.05% of molybdenum (Mo), 0.003% or less of titanium (Ti) (excluding 0%), and the balance of Fe and inevitable impurities, and satisfies relationships 1 and 2, wherein the microstructure thereof is ferrite single phase and satisfies relationship 3.

3 Claims, 1 Drawing Sheet

(51) Int. Cl.
*C21D 6/00* (2006.01)
*C21D 8/02* (2006.01)
*C21D 9/46* (2006.01)
*C22C 38/00* (2006.01)
*C22C 38/02* (2006.01)
*C22C 38/04* (2006.01)
*C22C 38/06* (2006.01)
*C22C 38/22* (2006.01)
*C22C 38/26* (2006.01)
*C22C 38/32* (2006.01)
*C23C 2/02* (2006.01)
*C23C 2/26* (2006.01)

(52) U.S. Cl.
CPC ........... *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/22* (2013.01); *C22C 38/26* (2013.01); *C22C 38/32* (2013.01); *C23C 2/0224* (2022.08); *C23C 2/26* (2013.01); *C21D 2211/005* (2013.01)

(56) References Cited

U.S. PATENT DOCUMENTS

| 9,598,745 | B2 | 3/2017 | Hayashi et al. |
| 10,961,601 | B2 | 3/2021 | Ono et al. |

| 2013/0248060 | A1 | 9/2013 | Maruyama et al. |
| 2020/0040424 | A1 | 2/2020 | Aarnts et al. |

FOREIGN PATENT DOCUMENTS

| JP | 2789261 | | 8/1998 |
| JP | 2002012920 | A | 1/2002 |
| JP | 2003268490 | | 9/2003 |
| JP | 2007321169 | A | 12/2007 |
| JP | 2008308732 | | 12/2008 |
| JP | 2008309732 | A | 12/2008 |
| JP | 2009132972 | A | 6/2009 |
| JP | 2011241429 | A | 12/2011 |
| KR | 20110005414 | | 1/2011 |
| KR | 20130081707 | | 7/2013 |
| KR | 20140048668 | | 4/2014 |
| WO | 2012070271 | A1 | 5/2012 |
| WO | 2017168991 | A1 | 10/2017 |

OTHER PUBLICATIONS

European Search Report—European Application No. 21892226.8 issued on Jul. 1, 2024, citing U.S. Pat. No. 9,090,960, JP H04-325656, and U.S. Pat. No. 9,598,745.

Japanese Office Action—Japanese Application No. 2023-528330 issued on Jun. 4, 2024, citing WO 2012/070271, JP 2009-132972, JP 2002-012920, WO 2017/168991, US 2020/0040424, and KR 10-2014-0048668.

Chinese Office Action—Chinese Application No. 202180076646.6 issued on Sep. 28, 2024, citing WO2012/070271, KR2014-0048668, JP2008-309732, JP2007-321169, JP2003-268490, and JP2011-241429.

* cited by examiner

BAKE-HARDENED HOT-DIP GALVANIZED STEEL SHEET WITH EXCELLENT POWDERING RESISTANCE, AND MANUFACTURING METHOD THEREFOR

TECHNICAL FIELD

The present disclosure relates to manufacturing of a bake-hardened hot-dip galvanized steel sheet having excellent powdering resistance, and more specifically, to a bake-hardened hot-dip galvanized steel sheet having excellent powdering resistance by controlling an annealing temperature, an alloying temperature of hot-dip galvanizing, elongation of a skin pass mill (SPM), and the like, which are main process factors in a hot-dip galvanizing line, in a bake-hardened hot-dip galvanized steel sheet in which a content of C is 0.005% by weight or less and a content of P is controlled to 400 ppm or less, and a manufacturing method thereof.

BACKGROUND ART

Recently, in the field of automobiles, research to reduce a weight of a vehicle body is being actively conducted in developed countries, led by Europe, for reasons of fuel economy regulations and performance improvements, and in the case of steel parts, efforts are being made to increase the strength, and to further reduce a thickness of the steel sheet, compared to competing materials (Mg, Al, CFRP, and the like), in the same grade in order to respond to the demand for weight reductions by automobile companies. In addition, in order to be applied as a material for automobile exterior panels, it is required to have a certain level of bake hardenability. The bake hardening phenomenon is a phenomenon in which yield strength increases due to solid solution carbon and nitrogen activated during coating and baking adhere to a dislocation generated during press part processing. Steel having excellent bake hardenability is easy to be formed before coating and baking, and it has a characteristic of improving dent resistance in a final product, so it is ideal as a material for automobile exterior panels. In addition, in order to be applied as a material for automobile exterior panels, it is required to have a certain level of aging resistance so as to guarantee aging for a certain period or more.

In general, as a method of manufacturing a cold-rolled steel sheet having bake hardenability, steel having a bake hardening amount of about 40 to 50 MPa was mainly used by a phase annealing method by simply coiling low-carbon P-added Al-killed steel at a low temperature, that is, using low-temperature coiling having a hot-rolled coiling temperature in a temperature range of 400 to 500° C. This was because coexistence of formability and bake hardenability was easier through batch annealing. In the case of P-added Al-Killed steel from a continuous annealing method, it is easy to secure bake hardenability because it uses a relatively fast cooling rate, but there is a problem that formability deteriorates due to rapid heating and short annealing, so it is limited to automobile exterior plates not requiring workability. Thanks to the recent rapid development of steelmaking technology, it is possible to control an appropriate amount of dissolved elements in steel, and bake-hardened cold-rolled steel sheets having excellent formability may be manufactured using an Al-Killed steel sheet with strong carbonitride-forming elements such as Ti or Nb added, so there is an increasing trend for using the same for automobile exterior plates requiring dent resistance.

Meanwhile, a technology for manufacturing a bake-hardened hot-dip galvanized steel sheet having a micro alloy free for exposed (MAFE) concept with fine crystal grains using nano-sized CuS/MnS precipitates has been proposed, but there is a problem in that surface quality is inferior due to a high content of P of 500 ppm. In addition, alloying is delayed due to addition of P, so a hot-dip galvanizing alloying temperature should be increased. As a result, a powdering problem in which a plating layer is detached in a form of powder due to compressive stress during forming of pressed parts due to an increase in a brittle r phase having high hardness in the plating layer, may occur. Such powdering defects deteriorate corrosion resistance due to peeling of the plating layer, and the peeled powder may adhere to a mold to cause defects such as dents in the steel sheet.

PRIOR ART DOCUMENT (Patent Document 1) Korean Patent Publication KR2014-0048668 (published on Apr. 24, 2014)
(Patent Document 2) Korean Patent Publication KR2011-0005414 (published on Jan. 18, 2011)

SUMMARY OF INVENTION

Technical Problem

An aspect of the present disclosure is to provide a bake-hardened hot-dip galvanized steel sheet having excellent powdering resistance by strictly controlling components of steel and main process conditions in a hot-dip galvanizing line, in a bake-hardened hot-dip galvanized steel sheet in which a content of C is 0.005 weight or less and a content of P is controlled to 400 ppm or less, and a manufacturing method thereof.

The subject of the present invention is not limited to the above. The subject of the present invention will be understood from the overall content of the present specification, and those of ordinary skill in the art to which the present invention pertains will have no difficulty in understanding the additional subject of the present invention.

Solution to Problem

According to an aspect of the present disclosure,
provided is a bake-hardened hot-dip galvanized steel sheet having excellent powdering resistance, the bake-hardened hot-dip galvanized steel sheet having excellent powdering resistance by wt %: 0.0001 to 0.005% of carbon (C), 0.1 to 1.2% of manganese (Mn), 0.02% or less of silicon (Si) (excluding 0%), 0.01 to 0.04% of phosphorus (P), 0.01% or less of sulfur (S) (excluding 0%), 0.01% or less of nitrogen (N) (excluding 0%), 0.01 to 0.06% of aluminum (sol.Al), 0.003 to 0.015% of niobium (Nb), 0.0005 to 0.0035% of boron (B), 0.01 to 0.1% of chromium (Cr), 0.005 to 0.05% of molybdenum (Mo), and a balance of Fe and inevitable impurities, and satisfies the following relationships 1 and 2, wherein a microstructure thereof is a ferrite single phase and satisfies the following relationship 3.

$[Nb]/((93/12) \times [C]) < 0.55$ [Relationship 1]

$[Mn]/((55/28) \times [Si]) > 10$ [Relationship 2]

$[TS] \times [El.] \times [Upper\text{-}BH] > 500{,}000$ (MPa×%) [Relationship 3]

where, [Upper-BH] is Upper Yield Stress when baked at 170° C. for 20 minutes after 2% pre-strain.

According to another aspect of the present disclosure, provided is a method for manufacturing a bake-hardened hot-dip galvanized steel sheet having excellent powdering resistance, the method including operations of:

re-heating a steel slab including: by wt %, 0.0001 to 0.005% of carbon (C), 0.1 to 1.2% of manganese (Mn), 0.02% or less of silicon (Si) (excluding 0%), 0.01 to 0.04% of phosphorus (P), 0.01% or less of sulfur (S) (excluding 0%), 0.01% or less of nitrogen (N) (excluding 0%), 0.01 to 0.06% of aluminum (sol.Al), 0.003 to 0.015% of niobium (Nb), 0.0005 to 0.0035% of boron (B), 0.01 to 0.1% of chromium (Cr), 0.005 to 0.05% of molybdenum (Mo), and a balance of Fe and inevitable impurities, satisfying the following relationships 1 and 2, at a temperature of 1000 to 1250° C.;

hot-rolling the re-heated steel slab at a temperature in a range of 900 to 1100° C.;

cooling the hot-rolled steel sheet to a temperature in a range of 500 to 700° C. at an average cooling rate of 10 to 70° C./sec, and then coiling the steel sheet;

cold-rolling the coiled hot-rolled steel sheet at a reduction rate of 70 to 90%, and then performing continuous annealing in a temperature range of 740 to 850° C.;

immersing the continuous annealed cold-rolled steel sheet in a hot-dip galvanized plating bath, and then alloying the steel sheet in a temperature range of 450 to 540° C. to manufacture a hot-dip galvanized steel sheet; and performing skin pass rolling on the manufactured hot-dip galvanized steel sheet in a range of a reduction rate of 0.5 to 2.0%, wherein the following relationship 4 is satisfied.

$$[Nb]/((93/12) \times [C]) < 0.55 \quad \text{[Relationship 1]}$$

$$[Mn]/((55/28) \times [Si]) > 10 \quad \text{[Relationship 2]}$$

$$\text{Powdering} = [-14.2 + 0.0362 \times (GA) - 0.970 \times (CGL\ SPM\ El.)] < 3 \quad \text{[Relationship 4]}$$

where, (GA) is a hot-dip galvanizing alloying temperature, and (CGL SPM El.) is skin pass rolling elongation in a continuous hot-dip galvanizing line.

The skin pass-rolled hot-dip galvanized steel sheet may satisfy the following Relationship 3.

$$[TS] \times [El.] \times [\text{Upper-BH}] > 500{,}000\ (MPa \times \%) \quad \text{[Relationship 3]}$$

where, [Upper-BH] is: Upper Yield Stress when baked at 170° C. for 20 minutes after 2% pre-strain.

Advantageous Effects of Invention

As set forth above, according to the present disclosure having the configuration as described above, by appropriately controlling a composition of alloying elements to be added and a manufacturing method thereof, a hot-dip galvanized steel sheet having an upper baking hardening (BH) value for evaluating bake hardenability and a TS×El×Upper-BH value, which is a comprehensive index of strength of a basic tensile test, and elongation thereof of 500,000 (MPa× %) or more and having excellent bake hardenability with powdering resistance of 3 or less may be effectively provided.

BEST MODE FOR INVENTION

Figure 1:
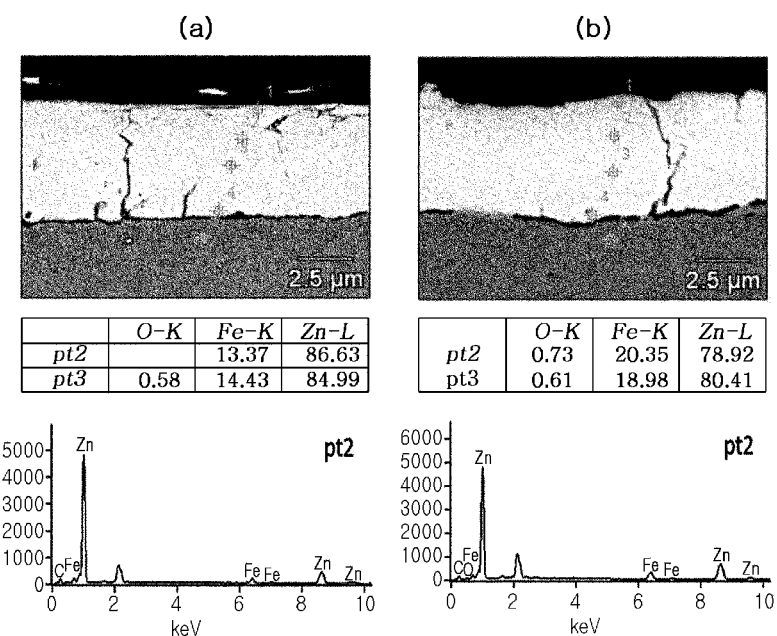
FIG. 1 is a diagram illustrating BSE images (×7000) and EDS component analysis results of alloying plating layers after hot-dip galvanizing of hot-dip galvanized steel sheets of Inventive Example 1 and Comparative Example 4 of the present disclosure, respectively.

Hereinafter, the present disclosure will be described.

The present inventors have confirmed through experiments that target physical properties may be secured when a steel composition, annealing, and gold operation conditions, satisfy a specific relationship, thereby completing the present disclosure. Specifically, the present disclosure relates to a bake-hardened hot-dip galvanized steel sheet in which a hot-dip galvanized layer is formed on a base steel sheet, wherein the base steel sheet includes, by wt %: 0.0001 to 0.005% of carbon (C), 0.1 to 1.2% of manganese (Mn), 0.02% or less of silicon (Si) (excluding 0%), 0.01 to 0.04% of phosphorus (P), 0.01% or less of sulfur (S) (excluding 0%), 0.01% or less of nitrogen (N) (excluding 0%), 0.01 to 0.06% of aluminum (sol.Al), 0.003 to 0.015% of niobium (Nb), 0.0005 to 0.0035% of boron (B), 0.01 to 0.1% of chromium (Cr), 0.005 to 0.05% of molybdenum (Mo), and a balance of Fe and inevitable impurities, and satisfies the following relationships 1 and 2, wherein a microstructure thereof is a ferrite single phase and satisfies the following relationship 3.

Hereinafter, first, an alloy component of a base steel sheet constituting the hot-dip galvanized steel sheet of the present disclosure and a reason for limiting the content thereof will be described. Meanwhile, "%" herein means "% by weight" unless otherwise specified.

Carbon (C): 0.0001 to 0.005%

Carbon (C) is the most effective and important element in improving strength of steel, as an interstitial solid-solution element. Since C is dissolved inside a steel sheet during cold rolling and annealing processes in ultra-low carbon steel and interacts with a dislocation formed by skin pass rolling to exhibit bake hardenability, the higher the content of C, the better the bake hardenability. However, if too much dissolved carbon is present in a material, aging defects causing defects known as orange peel defects on a surface during forming of parts may occur. According to the present disclosure, when a content of C exceeds 0.005%, it is disadvantageous in terms of formability and room temperature aging resistance is greatly inferior and there is a limitation in application of parts, so that a range thereof is limited to 0.0001 to 0.005%. Preferably, the content of C is controlled to be within a range of 0.0005 to 0.004%.

Manganese (Mn): 0.1 to 1.2%

Manganese (Mn) is a solid solution strengthening element not only contributing to increases in strength but also serving to precipitate S in steel as MnS. When the content of Mn is less than 0.1%, MnS cannot be effectively precipitated so that drawability is deteriorated. On the other hand, when the content of Mn exceeds 1.2%, even though strength thereof is increased, the content of Mn may be excessively dissolved, and there may be a problem of also causing deterioration in drawability, so the content of Mn is preferably limited to 0.1 to 1.2%. Preferably, the content of Mn is controlled to be within the range of 0.2 to 1.0%.

Silicon (Si): 0.02% or less (excluding 0%)

Silicon (Si) contributes to an increase in strength of the steel sheet by solid solution strengthening, but when added in an amount of 0.02% or more, there is a problem of causing surface defects. In particular, when a [Mn]/[Si]atomic ratio in Relationship 2 described later exceeds 10, a hot-dip galvanized steel sheet having excellent surface quality may be manufactured.

Phosphorus (P): 0.01 to 0.04%

Phosphorous (P) is the most effective element for securing strength of steel, having the most excellent solid-solution strengthening effect in ultra-low carbon steel, and without significantly impairing drawabliity. In particular, P is easily segregated at a grain boundary and inhibits grain growth during annealing, thereby helping to improve room temperature aging resistance as the grains are refined. However, when the content of P is less than 0.01%, it is impossible to secure a desired degree of strength. On the other hand, when the content of P exceeds 0.04%, defects in a form of blade lines may be caused due to P segregation in a surface layer portion on a surface after hot-dip galvanizing. In addition, since a high content of P delays alloying of hot-dip galvanizing, an alloying temperature should be increased, and as a result, a brittle Fe—Zn intermetallic compound (r) in the plating layer increases, resulting in poor powdering properties. Preferably, the content of P is controlled to be within a range of 0.015 to 0.04%.

In the present disclosure, other alloy elements and process manufacturing conditions were optimized to control the content of P, which is a key element, and to secure bake hardenability and powdering resistance.

Sulfur (S): 0.01% or less (excluding 0%)

Sulfur (S) is an impurity inevitably included in steel, and it is preferable to control a content of S to be as low as possible. In the present disclosure, the content of S is controlled to be 0.01% or less, and the content of N is preferably controlled to be 0.005% or less. In particular, since sulfur (S) in steel increases the possibility of generating red-hot brittleness, the content of S is controlled to be 0.01% or less.

Nitrogen (N): 0.01% or less (excluding 0%)

Nitrogen (N) is an impurity that is inevitably included in steel, and it is important to control a content of N to be as low as possible. However, since there is a problem in that a steelmaking cost of steel significantly increases, the content of N is controlled to be 0.01% or less, which is a possible range for operating conditions.

Aluminum (sol.Al): 0.01 to 0.06%

Acid-soluble aluminum is an element added for grain size refinement and deoxidation, and when a content of sol.Al is less than 0.01%, aluminum-killed steel may not be produced in a normal stable state. On the other hand, when the content of sol.Al exceeds 0.06%, it is advantageous in increasing strength due to a crystal grain refinement effect, but there may be a problem of not only increasing the possibility of surface defects of the plated steel sheet due to excessive formation of inclusions during a steelmaking operation, but also causing a significant increase in manufacturing costs. Therefore, in the present disclosure, the content of acid-soluble aluminum (sol.Al) is controlled to 0.01 to 0.06%.

Niobium (Nb): 0.003 to 0.015%

Niobium (Nb) is combined with carbon in steel during hot rolling and precipitated as NbC, thereby reducing dissolved carbon and affecting bake hardenability and aging resistance. As a content of C in the steel precipitated as NbC increases, the content of dissolved C decreases, and although it is advantageous in terms of aging resistance properties, bake hardenability decreases. Through control of an appropriate level of dissolved carbon, excellent bake hardenability may be obtained on the premise of securing room temperature aging resistance, and niobium is an important element for controlling such dissolved carbon.

When a content of niobium (Nb) is less than 0.003%, there is almost no carbon precipitated as NbC, so most C in steel remains as dissolved carbon, which is advantageous for bake hardenability, but there is a problem of deterioration in aging resistance at room temperature, which limits the application of parts. In addition, when the content of niobium (Nb) exceeds 0.015%, on the contrary thereto, most C in steel is precipitated as NbC, and the content of dissolved C is entirely insufficient, so even if the room temperature aging resistance is advantageous, an upper BH value of 30 MPa or more, required for GA steel sheet cannot be secured. Therefore, in the present disclosure, it is preferable to control the content of Nb to 0.003 to 0.015%. More preferably, the content of Nb is controlled to a range of 0.0035 to 0.010%

In addition, as mentioned in relationship 1 described later, when an [Nb]/[C] atomic ratio is less than 0.55, bake hardenability may be excellent without impairing aging resistance.

Boron (B): 0.0005 to 0.0035%

Boron (B) is an element added to prevent secondary work embrittlement due to grain boundary embrittlement in ultra-low carbon steel containing a large amount of a P component. In general, Boron (B) has higher grain boundary segregation tendency than other elements, so B serves to prevent secondary work embrittlement by suppressing P segregation at grain boundaries by adding boron. In addition, when boron is added within the scope of the disclosure, it may be possible to secure bake hardenability by increasing interaction with dislocations during baking. However, when a content of B exceeds 0.0035%, there is a concern that peeling of a plating layer of the hot-dip galvanized steel sheet, so it is preferable to limit the content of B to 0.0005 to 0.0035%. More preferably, the content of B content is controlled to a range of 0.0005 to 0.003%.

Chromium (Cr): 0.01 to 0.1%

Chromium (Cr) is a component added to improve hardenability of steel and ensure high strength, and is an element, playing a crucially important role in formation of martensite, but in the bake-hardened steel sheet of the present disclosure, Cr is a ferrite stabilizing element, and is added for the purpose of increasing strength to secure strength according to control of the content of P. When added in excess of the scope of the present disclosure, there may be a problem with corrosion resistance of a bare plate and an excessive increase in a cost of alloy iron, so Cr is added at the level of the scope of the present disclosure. More preferably, the content of Cr is controlled to a range of 0.02 to 0.08%.

Molybdenum (Mo): 0.005 to 0.05%

Like chromium, Molybdenum (Mo) is an element improving hardenability of steel, and is an element that can obtain a high hardenability effect by adding about 0.005 to 0.05, of Molybdenum (Mo). The bake-hardened steel sheet of the present disclosure is a ferrite stabilizing element, and when molybdenum (Mo) is added within the scope of the present disclosure, a P segregation band is reduced due to formation of a Mo—P compound during rolling, resulting in excellent surface quality of the hot-dip galvanized steel sheet. When added beyond the above range, a cost of alloy iron is excessively increased, so molybdenum (Mo) is added to a level within the scope of the present disclosure. More preferably, the content of Mo is controlled to a range of 0.01 to 0.04%.

Relationship 1 and Relationship 2

In the present disclosure, an atomic ratio, defined by the following Relationship 1 is required to be controlled to less than 0.55. When an atomic ratio of [Nb] and [C] is 0.55 or more, an amount of precipitated NbC increases and a dissolved content of C is absolutely insufficient, making it difficult to secure an Upper BH value of 30 MPa or more, required for a GA steel sheet.

In addition, in the present disclosure, the atomic ratio of [Mn] and [Si] defined by the following Relationship 2 is required to exceed 10. When the atomic ratio is 10 or less, surface quality of the steel sheet may be inferior due to the formation of a surface Mn—Si composite oxide during annealing.

[Nb]/((93/12)×[C])<0.55 [Relationship 1]

[Mn]/((55/28)×[Si])>10 [Relationship 2]

A remainder of the present disclosure may be iron (Fe). However, in a general manufacturing process, inevitable impurities may be inevitably added from raw materials or an ambient environment, and thus, impurities may not be excluded. A person skilled in the art of a general manufacturing process may be aware of the impurities, and thus, the descriptions of the impurities may not be provided in the present disclosure.

Meanwhile, a base steel sheet constituting the hot-dip galvanized steel sheet of the present disclosure has a microstructure of a ferrite single phase and satisfies the following Relationship 3.

[TS]×[El.]×[Upper-BH]>500,000 (MPa×%) [Relationship 3]

where, [Upper-BH] is: Upper Yield Stress when baked at 170° C. for 20 minutes after 2% pre-strain.

The Relationship 3 is an expression related to a comprehensive index with an [Upper-BH] value, which is an index of bake hardenability, and tensile strength and elongation, which are basic tensile properties. When the Relationship 3 is less than 500,000 (MPa×%), the tensile strength, elongation, and U-BH value, normally required exceed a lower limit, so that physical properties may be inferior.

Next, a method for manufacturing a hot-dip galvanized steel sheet having excellent powdering resistance and bake hardenability according to the present disclosure will be described in detail.

According to an aspect of the present disclosure, a method for manufacturing a bake-hardened hot-dip galvanized steel sheet having excellent powdering resistance, including operations of: re-heating a steel slab including: by wt %, 0.0001 to 0.005% of carbon (C), 0.1 to 1.2% of manganese (Mn), 0.02% or less of silicon (Si) (excluding 0%), 0.01 to 0.04% of phosphorus (P), 0.01% or less of sulfur (S) (excluding 0%), 0.01% or less of nitrogen (N) (excluding 0%), 0.01 to 0.06% of aluminum (sol.Al), 0.003 to 0.015% of niobium (Nb), 0.0005 to 0.0035% of boron (B), 0.01 to 0.1% of chromium (Cr), 0.005 to 0.05% of molybdenum (Mo), 0.003% or less of titanium (Ti) (excluding 0%), and a balance of Fe and inevitable impurities, which satisfies the following relationships 1 and 2, at a temperature of 1000 to 1250° C.; hot-rolling the re-heated steel slab at a temperature in a range of 900 to 1100° C.; cooling the hot-rolled steel sheet to a temperature in a range of 500 to 700° C. at an average cooling rate of 10 to 70° C./sec, and then coiling the steel sheet; cold-rolling the coiled hot-rolled steel sheet at a reduction rate of 70 to 90%, and then performing continuous annealing in a temperature range of 740 to 850° C.; immersing the continuous annealed cold-rolled steel sheet in a hot-dip galvanized plating bath, and then alloying the steel sheet in a temperature range of 450 to 540° C. to manufacture a hot-dip galvanized steel sheet; and performing skin pass rolling on the manufactured hot-dip galvanized steel sheet in a range of a reduction rate of 0.5 to 2.0%, wherein the following relationship 4 is satisfied.

First, a steel slab having the above-described composition is re-heated at a temperature of 1000 to 1250° C. This process is performed to smoothly perform a subsequent hot-rolling process, and to sufficiently obtain target physical properties of the steel sheet. In this case, when the reheating temperature is less than 1000° C., slab inclusions, or the like may not be sufficiently re-dissolved, which may cause material deviation and surface defects after hot rolling, and when the reheating temperature exceeds 1250° C., the strength is lowered due to abnormal grain growth of austenite crystal grains, so the reheating temperature is preferably limited to 1000 to 1250° C.

Subsequently, in the present disclosure, the re-heated steel slab is hot-rolled at a temperature in a range of 900 to 1100° C. In this case, when hot rolling is started at a temperature, higher than 1100° C., a temperature of a hot-rolled steel sheet increases, so that a grain size becomes coarse, and surface quality of the hot-rolled steel sheet deteriorates. In addition, when the hot rolling is terminated at a temperature, lower than 900° C., development of grains, elongated due to excessive recrystallization delay and a high yield ratio are obtained, resulting in inferior cold rolling property and poor shear workability.

In the present disclosure, the hot-rolled steel sheet is cooled to a temperature in a range of 500 to 700° C. at an average cooling rate of 10 to 70° C./sec, and then coiled.

In this case, when the hot-rolled steel sheet is cooled to less than 500° C. and coiled, a shape of the steel sheet is deteriorated due to a too low coiling temperature, and deterioration of ductility is expected due to formation of fine crystal grains. On the other hand, when the hot-rolled steel sheet is cooled in excess of 700° C. and then coiled, coarse ferrite crystal grains are formed and coarse carbides and nitrides are easily formed, so that a material of steel may be deteriorated.

In addition, when an average cooling rate during the cooling is less than 10° C./sec, coarse ferrite crystal grains are formed and a microstructure thereof may become non-uniform, and when an average cooling rate during the cooling exceeds 70° C./sec, not only distortion of a plate shape occurs, but also a microstructure of the plate in a thickness direction is non-uniform, so that the shear workability of the steel may be inferior.

Next, in the present disclosure, the coiled hot-rolled steel sheet is cold-rolled at a reduction rate of 70 to 90%, and then continuously annealed at a temperature range of 740 to 850° C.

In the present disclosure, during cold rolling of the coiled hot-rolled steel sheet, a cold rolling reduction rate is preferably in the range of 70 to 90%. When the cold rolling reduction rate is less than 70%, it may be difficult to secure a target thickness, and it may be difficult to correct a shape of the steel sheet. On the other hand, when the cold rolling reduction rate exceeds 901, cracks may occur in an edge portion of the steel sheet, and a cold rolling load may be caused.

Meanwhile, in this case, when rolled using a rolling mill, mainly composed of 5 to 6 stands, a cold-rolled steel sheet is manufactured by setting an initial stand reduction rate to 20 to 40%. This is because, when the initial stand reduction rate is less than 20%, there is a limit to the shape control of the hot-rolled steel sheet due to a low reduction rate, and when the initial stand reduction rate exceeds 40%, there is a load on equipment due to an increase in the initial stand reduction rate. The initial stand reduction rate is more preferably 25 to 35%.

The cold-rolled steel sheet is continuously annealed in a continuous annealing line including a plating line, and in this case, an annealing temperature is preferably controlled to a range of 740 to 850° C. When the annealing temperature is less than 740° C., a structure thereof during cold rolling has not sufficient ferrite recrystallization, resulting in a mixed structure, and when the annealing temperature exceeds 850° C., a probability of field equipment troubles caused by too high temperature annealing becomes very high and the crystal grains become too coarse, so that the properties required in the present disclosure cannot be secured. After continuous annealing, the steel sheet is cooled under normal working conditions.

Subsequently, in the present disclosure, the continuously annealed cold-rolled steel sheet is immersed in a hot-dip galvanizing plating bath, and then alloyed in a temperature range of 450 to 540° C., to manufacture a hot-dip galvanized steel sheet.

In the case of hot-dip galvanizing materials, it can be performed under normal conditions in a range of 440 to 480° C., which is a temperature of a hot-dip galvanizing bath.

Alloying is preferably performed in a temperature range of 450 to 540° C., after the hot-dip galvanizing. When an alloying temperature is lower than 450° C., non-plated areas may occur in an entire width of the annealed steel sheet, and when the alloying temperature exceeds 540° C., powdering properties are inferior due to a brittle Fe—Zn intermetallic compound (r) due to excessive alloying.

In the present disclosure, after the hot-dip galvanizing, skin pass rolling is performed in a range of 0.5 to 2.0%. When skin pass rolling elongation is less than 0.5%, sufficient dislocations are not formed, it is disadvantageous in terms of a plate shape, and there is a concern of plating surface defects. On the other hand, when the skin pass rolling elongation exceeds 2%, an equipment load may occur due to a high load, and side effects such as plate breakage, or the like, may occur.

Meanwhile, in order to manufacture a bake-hardened hot-dip galvanized steel sheet having excellent powdering resistance, it is preferable to control a hot-dip galvanizing alloying temperature (GA) and continuous hot-dip galvanizing line skin pass rolling elongation (CGL SPM El.) so as to satisfy the following relationship 4. The following relationship 3 is a regression relationship between each variable and powdering resistance, and plating quality may be excellent when a value defined thereby is less than 3.

Powdering=[−14.2+0.0362×(GA)−0.970×(CGL SPM El.)]<3    [Relationship 4]

where, (GA) is a hot-dip galvanizing alloying temperature, and (CGL SPM El.) is skin pass rolling elongation in a continuous hot-dip galvanizing line.

MODE FOR INVENTION

Hereinafter, the present disclosure will be described in more detail with reference to Examples.

EXAMPLE

A steel slab illustrating a chemical composition of alloying elements illustrated in Table 1 below was prepared. Subsequently, a bake-hardened cold-rolled steel sheet was manufactured from the steel slab using a process for manufacturing a conventional bake-hardened cold-rolled steel sheet. Specifically, the steel slab reheating temperature is about 1100° C., and a hot-rolling finish temperature is 900 to 940° C., Ar3 temperature or higher, then, a hot-rolled steel sheet was cooled at a cooling rate of 30 to 50° C./sec, and then coiled at a temperature of 580 to 620° C. Subsequently, after pickling the hot-rolled steel sheet using hydrochloric acid, the steel sheet was cold-rolled at a cold rolling reduction rate of 75 to 80% to manufacture a cold-rolled steel sheet.

The cold-rolled steel sheets in which the cold rolling were performed were annealed at an annealing temperature as illustrated in Table 2 below and then cooled under normal conditions. Then, in order to manufacture a hot-dip galvanized steel sheet, the cold-rolled steel sheet was immersed in a hot-dip galvanizing pot maintained at a temperature around 460° C., which is a normal condition, and hot-dip galvanized, and subsequently, as illustrated in Table 2 below, an alloying treatment was performed by varying an alloying temperature. For the plated steel sheet on which hot-dip galvanizing was performed, a skin pass rolling ratio was given under the conditions illustrated in Table 2 below to manufacture a final hot-dip galvanized steel sheet.

For each of the above-manufactured hot-dip galvanized steel sheets, a tensile test was conducted in a rolling perpendicular direction using a JIS standard to measure yield strength (YP), tensile strength (TS), and elongation (El.) of the plated steel sheet, and the results thereof are shown in Table 2 below. In addition, Upper Yield Stress [U-BH] was measured when baked at 170° C. for 20 minutes after 2% pre-strain for the same standard, and the results thereof are also shown in Table 2 below.

In addition, it was determined whether or not the above-described Relationships 3 and 4 of the present disclosure was satisfied, and a case of satisfying the above-described Relationships 3 and 4 was marked as o, and a case of not satisfying the above-described Relationships 3 and 4 was marked as x.

TABLE 1

| Division | Steel composition (by weight %) | | | | | | | | | | | Relationship 1 | Relationship 2 |
| --- | --- | --- | --- | --- | --- | --- | --- | --- | --- | --- | --- | --- | --- |
| | C | Si | Mn | P | S | S. Al | Cr | Mo | Nb | B | N | | |
| Inventive steel 1 | 0.0027 | 0.012 | 0.577 | 0.03 | 0.0076 | 0.029 | 0.024 | 0.02 | 0.006 | 0.0009 | 0.0023 | 0.287 | 24.48 |
| Inventive steel 2 | 0.002 | 0.014 | 0.816 | 0.0295 | 0.0058 | 0.0315 | 0.048 | 0.021 | 0.007 | 0.001 | 0.0018 | 0.452 | 29.67 |
| Inventive steel 3 | 0.0022 | 0.013 | 0.796 | 0.0287 | 0.007 | 0.0348 | 0.054 | 0.02 | 0.007 | 0.001 | 0.002 | 0.411 | 31.17 |
| Inventive steel 4 | 0.0019 | 0.009 | 0.782 | 0.0289 | 0.007 | 0.0372 | 0.056 | 0.016 | 0.0055 | 0.0009 | 0.0021 | 0.374 | 44.23 |
| Inventive steel 5 | 0.0019 | 0.009 | 0.782 | 0.0289 | 0.007 | 0.0372 | 0.056 | 0.016 | 0.0055 | 0.0009 | 0.0021 | 0.374 | 44.23 |

TABLE 1-continued

| Division | Steel composition (by weight %) | | | | | | | | | | | Relationship 1 | Relationship 2 |
|---|---|---|---|---|---|---|---|---|---|---|---|---|---|
| | C | Si | Mn | P | S | S. Al | Cr | Mo | Nb | B | N | | |
| Inventive steel 6 | 0.0023 | 0.011 | 0.804 | 0.0292 | 0.0072 | 0.0365 | 0.052 | 0.028 | 0.006 | 0.001 | 0.0022 | 0.337 | 37.21 |
| Comparative steel 1 | 0.0019 | 0.06 | 0.658 | 0.0322 | 0.004 | 0.036 | 0.053 | 0.015 | 0.006 | — | 0.0016 | 0.407 | 5.58 |
| Comparative steel 2 | 0.0013 | 0.06 | 0.557 | 0.0272 | 0.006 | 0.033 | 0.028 | 0.015 | 0.009 | 0.001 | 0.0018 | 0.893 | 4.73 |
| Comparative steel 3 | 0.0013 | 0.06 | 0.65 | 0.0251 | 0.0084 | 0.035 | 0.02 | — | 0.009 | 0.003 | 0.002 | 0.893 | 5.52 |
| Comparative steel 4 | 0.0015 | 0.014 | 0.827 | 0.0283 | 0.0053 | 0.029 | 0.054 | 0.018 | 0.008 | 0.001 | 0.0024 | 0.688 | 30.07 |
| Comparative steel 5 | 0.0014 | 0.01 | 0.496 | 0.0276 | 0.0062 | 0.0327 | 0.048 | 0.013 | 0.006 | 0.0009 | 0.0017 | 0.553 | 25.25 |
| Comparative steel 6 | 0.0017 | 0.014 | 0.827 | 0.0283 | 0.0053 | 0.029 | 0.054 | 0.018 | 0.008 | 0.001 | 0.0024 | 0.607 | 30.07 |
| Comparative steel 7 | 0.0021 | 0.011 | 0.556 | 0.0274 | 0.0075 | 0.031 | 0.025 | 0.02 | 0.009 | 0.001 | 0.0022 | 0.553 | 25.73 |
| Comparative steel 8 | 0.002 | 0.06 | 0.632 | 0.331 | 0.005 | 0.035 | 0.052 | 0.016 | 0.007 | 0.001 | 0.002 | 0.452 | 5.36 |

*In Table 1, the remaining components are Fe and inevitable impurities.

TABLE 2

| Division | Manufacturing condition | | | | Mechanical property | | | | Relationship 3 | Reference |
|---|---|---|---|---|---|---|---|---|---|---|
| | SS (° C.) | GA (° C.) | SPM El (%) | Relationship 4 | YP (MPa) | TS (MPa) | EL (%) | U-BH (MPa) | | |
| Inventive steel 1 | 778 | 500 | 1.6 | ○ | 232 | 369 | 39 | 42 | ○ | Inventive example 1 |
| | 766 | 500 | 1.8 | ○ | 230 | 355 | 39 | 47 | ○ | Inventive example 2 |
| | 785 | 528 | 1.6 | x | 224 | 348 | 40 | 39 | ○ | Comparative example 1 |
| | 791 | 500 | 2.3 | ○ | 246 | 358 | 38 | 36 | x | Comparative example 2 |
| | 804 | 500 | 2.4 | ○ | 248 | 360 | 37 | 36 | x | Comparative example 3 |
| | 790 | 536 | 1.6 | x | 223 | 345 | 40 | 42 | ○ | Comparative example 4 |
| Inventive steel 2 | 805 | 500 | 1.7 | ○ | 223 | 353 | 40 | 44 | ○ | Inventive example 3 |
| | 803 | 532 | 1.6 | x | 237 | 358 | 39 | 45 | ○ | Comparative example 5 |
| | 800 | 504 | 2.2 | ○ | 247 | 358 | 37 | 36 | x | Comparative example 6 |
| | 805 | 504 | 2.4 | ○ | 249 | 362 | 38 | 35 | x | Comparative example 7 |
| Inventive steel 3 | 806 | 498 | 1.6 | ○ | 227 | 361 | 39 | 54 | ○ | Inventive example 4 |
| Inventive steel 4 | 805 | 499 | 1.6 | ○ | 226 | 352 | 40 | 52 | ○ | Inventive example 5 |
| Inventive steel 5 | 796 | 498 | 2 | ○ | 238 | 355 | 40 | 49 | ○ | Inventive example 6 |
| Inventive steel 6 | 799 | 499 | 1.8 | ○ | 235 | 359 | 39 | 56 | ○ | Inventive example 7 |
| Comparative steel 1 | 777 | 552 | 1.6 | x | 236 | 356 | 40 | 53 | ○ | Comparative example 8 |
| Comparative steel 2 | 770 | 532 | 1.58 | x | 226 | 359 | 40 | 34 | x | Comparative example 9 |
| Comparative steel 3 | 800 | 533 | 1.59 | x | 221 | 353 | 40 | 37 | ○ | Comparative example 10 |
| Comparative steel 4 | 800 | 499 | 1.8 | ○ | 234 | 365 | 40 | 36 | ○ | Comparative example 11 |
| Comparative steel 5 | 770 | 531 | 1.61 | x | 211 | 347 | 40 | 27 | x | Comparative example 12 |
| Comparative steel 6 | 767 | 500 | 2.0 | ○ | 244 | 368 | 38 | 34 | x | Comparative example 13 |
| Comparative steel 7 | 812 | 500 | 1.6 | ○ | 212 | 339 | 40 | 35 | x | Comparative example 14 |

TABLE 2-continued

| Division | Manufacturing condition | | | | Mechanical property | | | | | Reference |
|---|---|---|---|---|---|---|---|---|---|---|
| | SS (° C.) | GA (° C.) | SPM El (%) | Relationship 4 | YP (MPa) | TS (MPa) | EL (%) | U-BH (MPa) | Relationship 3 | |
| Comparative steel 8 | 785 | 529 | 1.6 | x | 240 | 359 | 40 | 41 | ○ | Comparative example 15 |

\* In Table 2, SS represents a continuous annealing temperature, GA represents an alloying temperature, and SPM El. represents skin pass rolling elongation. In addition, relationship 3 refers to [TS] × [El.] × [Upper-BH] > 500,000 (MPa × %), and relationship 4 refers to Powdering = [−14.2 + 0.0362 × (GA) − 0.970 × (CGL SPM El.)] < 3.

As illustrated in the above Table 1 and 2, Inventive Examples 1 to 7 satisfying a range of a content of elements, process conditions, and relationships 1 to 4 of the present disclosure exhibit that a hardened hot-dip galvanized steel sheet having excellent surface quality and excellent powdering resistance properties, as well as securing basic tensile properties, may be manufactured.

In contrast thereto, all Comparative Examples 1 to 7 in which steel composition components thereof are within the scope of the present disclosure, but process conditions for manufacturing the plated steel sheet deviates from the scope of the present disclosure, exhibited poor powdering resistance and mechanical properties. Specifically, Comparative Example 1, Comparative Example 4, and Comparative Example 5 are cases, not satisfying Relationship 4, and in these cases, an alloying temperature was relatively high, so that powdering resistance is inferior due to formation of a brittle r phase in the alloying plating layer.

In addition, in Comparative Examples 2 and 3 and 6 and 7, when SPM elongation is higher, 2% or more, the yield strength increased due to hardening due to formation of excessive mobile dislocations, but the elongation decreased and a sufficient BH increase did not occur, so that a BH value was inferior. In addition, in Comparative Example 8, Comparative Example 9, Comparative Example 10, and Comparative Example 12, powering resistance was basically inferior as compared to the Inventive Example due to formation of a brittle r phase in the alloying plating layer due to a high GA temperature.

In addition, Comparative Examples 9 to 14 did not satisfy Relationship 1 due to a high Nb/C atomic ratio, and had poor U-BH values due to a lack of C dissolved in steel, and Comparative Example 9 and Comparative Example 13 did not satisfy Relationship 3 as well.

In Comparative Example 8 and Comparative Example 10, B and Mo are not within the range of the components of the present disclosure, and Comparative Example 8 did not satisfy [Mn] and [Si] equations of Relationship 2, so surface quality was poor.

In addition, in Comparative Example 15 is a case in which the conditions for manufacturing the plated steel sheets were within the range of the present disclosure, but a steel sheet, not satisfying the Relationship 2 was used in the steel composition, and plating surface quality was poor due to formation of a Mn—Si composite oxide during annealing.

Meanwhile, FIG. 1 is a diagram illustrating BSE images (×7000) and EDS component analysis results of alloying plating layers after hot-dip galvanizing of hot-dip galvanized steel sheets of Inventive Example 1 and Comparative Example 4, respectively.

Comparing Inventive Example 1 and Comparative Example 4, the basic composition thereof is the same, but an Fe content is different in the alloying plating layer due to a GA temperature difference. Checking pt 2 and 3 results, performing point EDS analysis on a middle portion of the alloying plating layer, in the case of Inventive Example 1, the Fe content was 13 to 14%, and in the case of Comparative Example 4, the Fe content was 19 to 20%. Typically, when the Fe content is 7 to 12%, a δ intermetallic compound of $FeZn_7$ is formed, and when the Fe content is 17 to 20%, a P intermetallic compound of $Fe_5Zn_{21}$ is formed. As hardness of r is higher than that of δ, the thicker the r phase in the alloying plating layer, the more the powdering resistance deteriorates and plating peeling increases. That is, in the case of Comparative Example 4, it can be seen that powdering resistance is deteriorated due to formation of a thick P phase of the alloying plating layer as compared to Inventive Example 1.

While example embodiments have been shown and described above, it will be apparent to those skilled in the art that modifications and variations could be made without departing from the scope of the present disclosure as defined by the appended claims.

The invention claimed is:

1. A bake-hardened hot-dip galvanized steel sheet having excellent powdering resistance, comprising:
a steel sheet, the steel sheet including: by wt %, 0.0001 to 0.005% of carbon (C), 0.1 to 1.2% of manganese (Mn), 0.02% or less of silicon (Si), 0.01 to 0.04% of phosphorus (P), 0.01% or less of sulfur (S), 0.01% or less of nitrogen (N), 0.01 to 0.06% of aluminum (sol.Al), 0.003 to 0.015% of niobium (Nb), 0.0005 to 0.0035% of boron (B), 0.01 to 0.1% of chromium (Cr), 0.005 to 0.05% of molybdenum (Mo), and a balance of Fe and inevitable impurities, and satisfying the following relationships 1 and 2, wherein a microstructure thereof is a ferrite single phase and satisfies the following relationship 3, $$[Nb]/((93/12) \times [C]) < 0.55 \quad \text{[Relationship 1]}$$

$$[Mn]/((55/28) \times [Si]) > 10 \quad \text{[Relationship 2]}$$

$$[TS (MPa)] \times [El. (\%)] \times [Upper\text{-}BH (MPa)] > 500,000 \ (MPa^2 \times \%) \quad \text{[Relationship 3]}$$

where TS is a tensile strength (MPa), El is an elongation (%), and [Upper-BH] is Upper Yield Stress (MPa) when baked at 170° C. for 20 minutes after 2% pre-strain.

2. A method for manufacturing a bake-hardened hot-dip galvanized steel sheet having excellent powdering resistance, comprising operations of:
re-heating a steel slab including: by wt %, 0.0001 to 0.005% of carbon (C), 0.1 to 1.2% of manganese (Mn), 0.02% or less of silicon (Si), 0.01 to 0.04% of phosphorus (P), 0.01% or less of sulfur (S), 0.01% or less of nitrogen (N), 0.01 to 0.06% of aluminum (sol.Al), 0.003 to 0.015% of niobium (Nb), 0.0005 to 0.0035% of boron (B), 0.01 to 0.1% of chromium (Cr), 0.005 to 0.05% of molybdenum (Mo), and a balance of Fe and inevitable impurities, satisfying the following relationships 1 and 2, at a temperature of 1000 to 1250° C.;

hot-rolling the re-heated steel slab at a temperature in a range of 900 to 1100° C.;

cooling the hot-rolled steel sheet to a temperature in a range of 500 to 700° C. at an average cooling rate of 10 to 70° C./sec, and then winding the steel sheet;

cold-rolling the wound hot-rolled steel sheet at a reduction rate of 70 to 90%, and then performing continuous annealing in a temperature range of 740 to 850° C.;

immersing the continuous annealed cold-rolled steel sheet in a hot-dip galvanized plating bath, and then alloying the steel sheet in a temperature range of 450 to 540° C. to manufacture a hot-dip galvanized steel sheet; and performing skin pass rolling on the manufactured hot-dip galvanized steel sheet in a range of a reduction rate of 0.5 to 2.0%, wherein the following relationship 4 is satisfied, $$[Nb]/((93/12) \times [C]) < 0.55 \quad \text{[Relationship 1]}$$

$$[Mn]/((55/28) \times [Si]) > 10 \quad \text{[Relationship 2]}$$

$$\text{Powdering} = [-14.2 + 0.0362 \times (GA) - 0.970 \times (CGL\ SPM\ El.)] < 3 \quad \text{[Relationship 4]}$$

where, (GA) is a hot-dip galvanizing alloying temperature (° C.), and (CGL SPM EL.) is skin pass rolling elongation in a continuous hot-dip galvanizing line.

3. The method for manufacturing a bake-hardened hot-dip galvanized steel sheet having excellent powdering resistance of claim 2, wherein the skin pass-rolled hot-dip galvanized steel sheet satisfies the following relationship 3, $$[TS\ (MPa)] \times [El.\ (\%)] \times [\text{Upper-BH}\ (MPa)] > 500,000\ (MPa^2 \times \%) \quad \text{[Relationship 3]}$$

Where TS is an tensile strength (MPa), El is an elongation (%), and [Upper-BH] is Upper Yield Stress (MPa) when baked at 170° C. for 20 minutes after 2% pre-strain.

* * * * *